May 25, 1926.
G. A. JESSOP
1,585,862
BREAKABLE LINK FOR TURBINE GATES
Filed Dec. 30, 1924　2 Sheets-Sheet 1
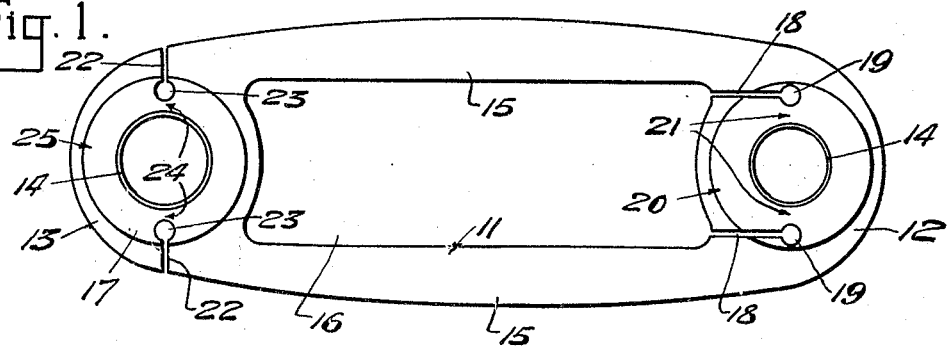
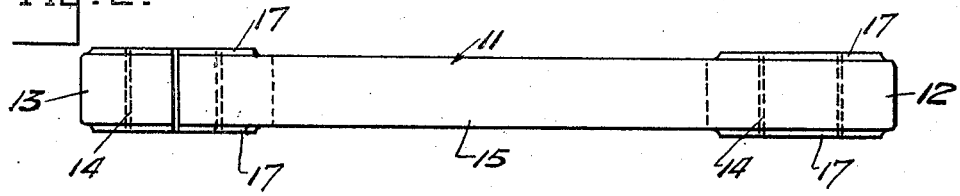
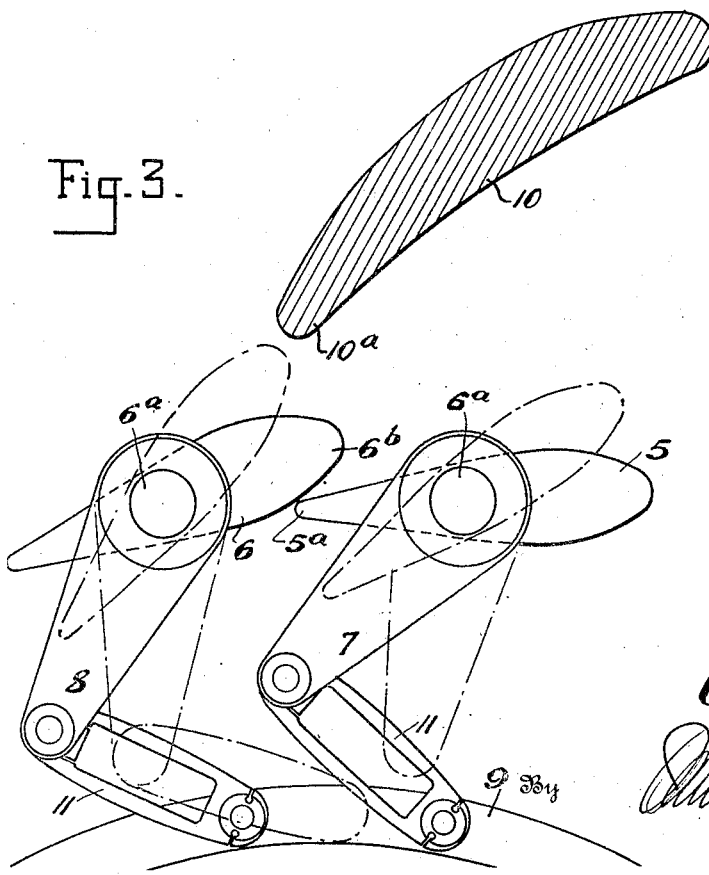
Inventor
George A. Jessop
Attorney May 25, 1926.
G. A. JESSOP
BREAKABLE LINK FOR TURBINE GATES
Filed Dec. 30, 1924    2 Sheets-Sheet 2
1,585,862
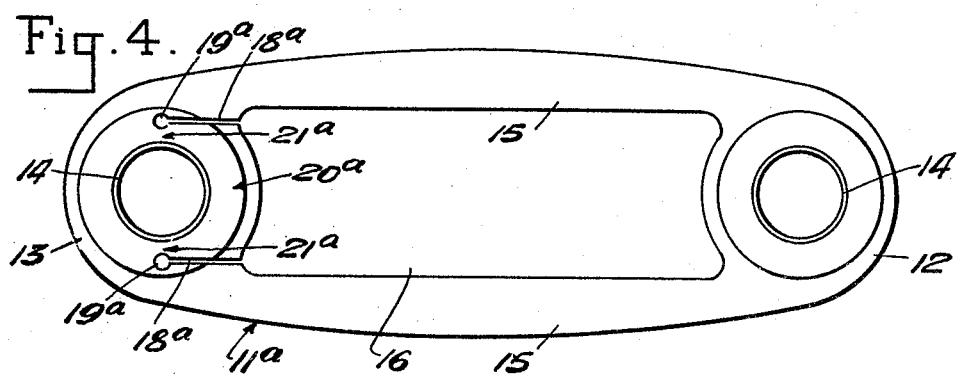
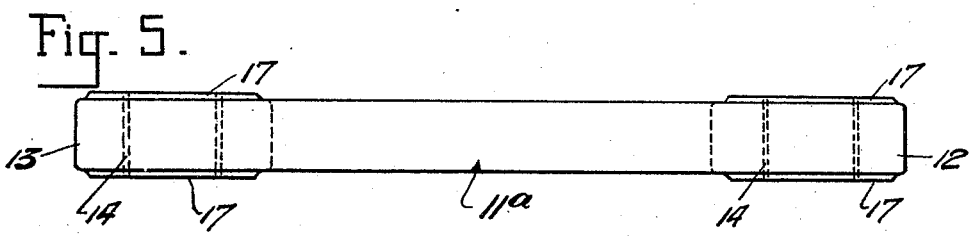
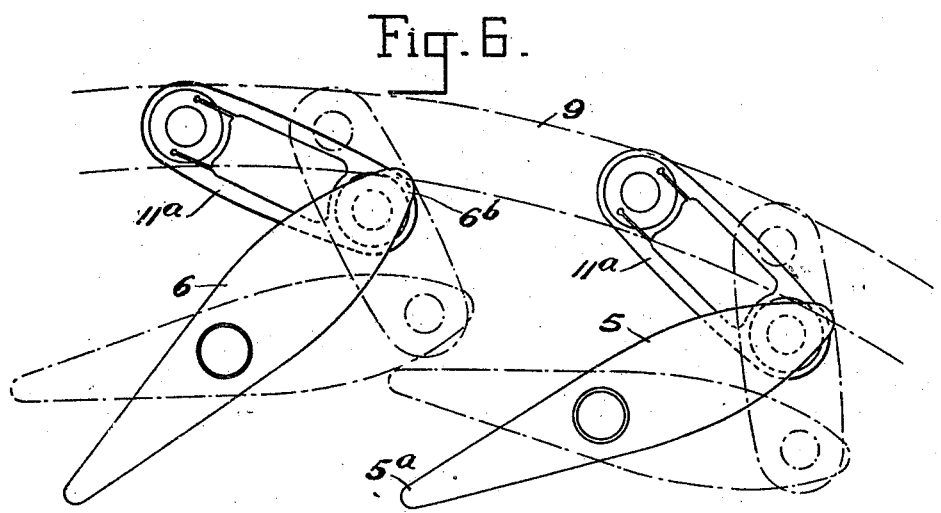
Inventor
George A. Jessop
By [signature]
Attorney Patented May 25, 1926.

1,585,862

UNITED STATES PATENT OFFICE.

GEORGE A. JESSOP, OF YORK, PENNSYLVANIA, ASSIGNOR TO S. MORGAN SMITH COMPANY, OF YORK, PENNSYLVANIA, A CORPORATION OF PENNSYLVANIA.

BREAKABLE LINK FOR TURBINE GATES.

Application filed December 30, 1924. Serial No. 758,871.

This invention relates to means associated with the gates and gate-operating devices of a hydraulic turbine, or for interposition between gates and devices for opening and closing the gates, and more specifically to a breakable link which will fracture and release a gate either during its opening or closing movements from operative coupled relation to the remaining gates of the same group.

An object of the invention is to provide a breakable link of simple and effective structure which is made amply strong for normal operation of the gate or gates during opening or closing movements thereof and has weakening structural features which will effect a breakage at either one or both ends of the same if there is an obstruction to the opening or closing movement of the gate or gates to which it is applied, or between a portion of any one of the gates and adjacent inert or movable parts of the turbine organization, without injury to the gates or gate-connecting devices, such as lever arms or stems, and thereby permit the governor mechanism to operate to full capacity to open or close the remaining gates that may not be affected by obstructive means.

A further object of the invention is to provide a breakable link connection for interposition between a gate and gate-operating means which is strong enough to effect an opening or closing movement of the gates without fracture thereof, and whereby the gates may be opened and closed under normal conditions but operable under abnormal stress or obstructive means imposed on any one or more of the gates to break and release the gate or gates that may be restricted in their movement by means that may become lodged between two of the gates or between any one of the gates and an adjacent part of the turbine organization, as, for instance, a guide vane or other connecting means between the upper and lower plates of a turbine casing, and whereby the governor mechanism or other means for operating a gate or gates to open and close the latter may be unaffected with respect to the unobstructed gates and thereby avoid shutting down the turbine unit for extensive repairs requiring a considerable length of time and consequent loss of power by reducing the extent of damage or injury and providing for a more ready rectification and replacement of injured parts.

A further object of the invention is to provide a breakable link of the class specified which is of low cost as compared with the cost of the other parts of the turbine organization with which it cooperates and which is also economical in view of the advantages ensuing from the use thereof and the ability to readily replace the same at a comparatively small expense.

With these and other objects and advantages in view, the invention consists in the construction and arrangement of the several parts which will be more fully hereinafter described and claimed in preferred form.

In the drawings:

Fig. 1 is a plan view of a breakable link embodying the features of the invention and showing a breakable structure at each end thereof.

Fig. 2 is an edge elevation of the link shown by Fig. 1.

Fig. 3 is a diagrammatic view in section and in plan, showing a guide vane, two turbine gates and a portion of a gate-operating ring with the improved links interposed between the gate-operating stem arms and levers and the ring, the gates being shown in closed and open positions in full and dotted lines.

Fig. 4 is a view similar to Fig. 1, showing a link embodying the features of the invention and breakable at one end only.

Fig. 5 is a side elevation of the link shown by Fig. 4.

Fig. 6 is a diagrammatic plan view, showing two turbine gates and a portion of a gate-operating ring with the form of the link shown by Fig. 4 interposed between the gates and ring, the link being shown in dotted lines and the gates and rings also being shown in open and closed positions, respectively, in full and dotted lines.

The numerals 5 and 6 designate turbine gates of any well known or approved form, having the usual gate pins or pivotal devices 6$^a$, to the upper ends of which arms or levers 7 and 8 are fixed and connected to a gate operating ring 9 of usual form and adapted to be actuated by suitable means to uniformly open and close the gates of a turbine. Disposed adjacent the outer portions of the gates as shown by Fig. 3 is a guide vane 10, there being in practice a number of these vanes disposed at regular spaced intervals around the gates as components of, or held by, a speed ring, not shown, and having well known functions. The turbine elements thus far described may be of any preferred form and are shown and described solely to demonstrate the practical operation and advantages of the present invention which relates to the connection between the gate stems or gate stem arms or levers and the gate-operating ring.

In the features of the invention as shown by Figs. 1 to 3, inclusive, the connection or link 11 between the gates and gate-operating ring comprises opposite rounded ends 12 and 13 with a central opening 14 in each end and side members or bars 15 integrally formed with the ends. Between the ends 12 and 13 and the members or bars 15 the link is formed with an opening 16. As a detail structural advantage the ends 12 and 13 around the openings 14 are formed with upper and lower circular bearing bosses 17. The end 12 of the link has two saw cuts or narrow slots 18 extending longitudinally with relation to the link and fully opening at their inner terminals into the main link opening 16 and at their outer terminals enter vertical apertures 19 in alinement with the transverse diameter of the end 12 and the opening 14 of the latter and spaced an equal distance from the said opening 14. By this means a breaking piece or element 20 is formed between the adjacent end wall of the main link opening 16 and the central portion of the link end 12. The width of the webs or portions 21 between the cuts or slot terminal apertures or openings 19 will be of such extent as to resist any tendency of the link at the end 12 to break under normal conditions, but when abnormal stress is imposed upon this end of the link, a fracture across the portions 21 will immediately ensue and the piece or element 20 will be liberated and obviously slacken or loosen the connection of the end 12 of the link. The opposite link end 13 is formed with two transverse cuts or narrow slots 22 in line with the transverse diameter of the adjacent opening 14 and extending through the opposite side portions of the said end 13 and terminating at or entering inner vertical apertures or openings 23 at equal distances from the adjacent opposite parts of the wall of the opening 14 and providing webs or connecting portions 24 between said vertical apertures or openings 23 and the opening 14. The formation and location of the cuts or slots 22 and inner terminal apertures or openings 23 as just explained provide for an outer end breaking piece or member 25. The webs or connecting portions 24 are also of such strength as to resist breakage of the end 13 of the link when subjected to pressure under normal gate operating conditions, but when the link end has abnormal strain or stress imposed thereon by resistance of the gates to open or close, the end 13 will fracture through the webs or connecting portions 24 and liberate the outer pice or member 25 and loosen the gate attachment with relation to the gate-operating ring 9. The ends 13 of the links are connected to the gate ring 9 and the opposite ends 12 are pivotally connected to the arms or levers 7 and 8 of the gates 5 and 6, the said arms or levers being in turn fixed to the upper ends of the usual gate pins or pivotal devices 6ª.

In the form of the invention shown by Figs. 4 to 6, inclusive, between the gates 5 and 6 and the gate ring 9 the links 11ª are interposed and have rounded ends 12 and 13 and central eyes or openings 14 formed therein, the links also being provided with side members or bars 15 integrally formed with the ends, as clearly shown by Fig. 4. Between the ends 12 and 13 and the side members or bars 15 each link is also formed with an elongated opening 16, the general structure of the link as shown by Figs. 4 to 6, inclusive, being in all respects similar to that shown by Figs. 1 to 3, inclusive, the difference in formation of the link shown by Figs. 4 to 6, inclusive, residing in the provision of one end only of the link with a weakening or breaking structure, as, for instance, the end 13 which connects with the ring or is adapted to be attached to any other gate-operating means. The weakened structure as shown in the end 13 in Fig. 4 is similar to that shown in the end 12 of the structure illustrated by Fig. 5 and consists of two saw cuts or narrow slots 18ª extending longitudinally of the link and communicating with the main link opening 16 and at their outer terminals have vertical apertures 19ª in alinement with the transverse diameter of the end 13 and the opening 14 of the latter and spaced an equal distance from said opening 14. By this means a breaking piece or element 20ª is formed between the adjacent end wall of the main link opening 16 and the central portion of the link end 13 in all respects similar to the structure of the end 12 of the link 11 heretofore described. The width of the webs or portions 21ª between the cut or slot terminal apertures or openings 19ª will be of such extent as to resist any tendency of the link at the end 13 to break under predetermined normal conditions, but when abnormal stress is imposed upon this end of the link, a fracture across the porfor actuating the gates under any conditions.

It is proposed to make the links of cast iron, steel, bronze or any other suitable material. In the event of breakage of any one or more of the links, access thereto and replacement thereof may be readily had with minimized interference with relation to, or interruption of, the operation of the turbine, with obvious advantages in reduced cost of repair.

What is claimed as new is:

1. The combination with a turbine having movable gates and operating means for opening and closing said gates, of connecting links interposed between the gates and operating means and each having a body with an opening through each end for connecting the same, the body of the link at opposite ends also being weakened to provide a breakable structure which will fracture by abnormal stress thereon and provide clearances for the openings relatively to the means for attaching the link and thereby produce a link which will automatically release itself at either end, whereby the gate or gates that may be obstructed against normal operation by the operating means may be released and permit operation of the remaining unobstructed gates of the group of gates.

2. The combination with a turbine having gates and means for opening and closing the gates, of links interposed between and connected to the gates, each link being formed with end openings and partially released means adjacent each opening for effecting an automatic fracture of the link and clearance of the openings in the ends of the link to release the gates that may be abnormally obstructed in their movement from the means for operating said gates and permit operation of the remaining unaffected gates of the group of gates.

3. The combination with a turbine having opening and closing gates and means for operating said gates, of links interposed between the gates and the operating means therefor, the links having attaching openings at each end and portions of the body terminals adjacent said openings partially released in different directions to effect automatic fracture and release of any of the gates subjected to abnormal resistance to movement from the means for operating the gates and permit operation of the remaining gates of the group without affecting the operating means.

4. In a device of the class specified, the combination with turbine gates, operating means movable around the gates, and guide vane means, of links interposed between and connected to portions of the gates and the operating means therefor, each link having connecting openings at opposite ends thereof and weakened body portions in different positions relatively to said openings to effect an automatic fracture and release of the link ends in reverse directions to disconnect the said links from the operating means for the gates when movement of any of the gates is obstructed and the link ends subjected to abnormal strain.

5. In a device of the class specified, the combination with turbine gates and movable operating means therefor, of breakable links interposed between and having their opposite extremities connected to the gates and operating means, each link having weakening means disposed at one end in longitudinal relation to the link and similar weakening means at the opposite end arranged in transverse relation to the latter.

6. In a device of the class specified, the combination with turbine gates and movable operating means therefor, of links interposed between and connected at opposite ends to the gates and operating means, the ends of the links connected to the gates having weakened breaking portions of the bodies thereof disposed longitudinally with relation to the links and adapted to break under abnormal stress, and the ends connected to the gate operating means likewise having weakened breaking body portions arranged transversely with relation to the links and adapted to break under abnormal stress.

7. A link for the purpose specified, having a centrally located connecting opening at each end, the one end of the link having spaced longitudinally-disposed cuts terminating at distances from opposite sides of the adjacent connecting opening, and the opposite end of the link having spaced transversely-arranged cuts also terminating at distances from the opposite sides of the connecting opening adjacent thereto.

8. A link for the purpose specified, having a centrally located connecting opening at each end, the one end of the link having spaced longitudinally-disposed cuts terminating in apertures through the link at distances from opposite sides of the adjacent connecting opening, and the opposite end of the link having spaced transversely-arranged cuts also terminating in apertures through the link at distances from the opposite sides of the connecting opening adjacent thereto.

9. A link for the purpose specified, having a connecting end opening therethrough with an adjacent weakened body part adapted to fracture by abnormal stress thereon and provide a clearance for said opening relatively to the means for attaching the link and thereby automatically disconnect the link.

10. A link for the purpose specified having an opening through each end thereof for connecting purposes, the one link end having an inner breakable member and the other tions 21ª will immediately ensue and the piece or element 20ª will be liberated and obviously slacken or loosen the connection of the end 13 of the link. In this slightly modified structure, or where the link has one end only provided with weaking slots or apertures both ends of the link are formed with upper and lower circular bearing bosses 17. The links 11ª are connected directly to the back or outside ends of the gates and it is necessary that these links be in compression when the gates are closed. This arrangement represents an open flume type of construction and the top plate of the turbine organization may be supported and spaced from the bottom plate by means of gate pins and there will be no guides or columns of any kind between which and the rear end of the gate any block or piece of débris might become lodged. This construction is well known in the art of turbine organizations and forms no part of the present invention, reference thereto being made simply to illustrate the particular application of the improved link having a breaking or weakening means at one end only. It will also be understood that this modified form of the link having a weakening or breaking structure at one end only might also be used in connection with a gate having an operating lever or arm as shown by Fig. 3, and also where means other than guide vanes or round columns are placed close to the outside ends of the gates when opened, for the purpose of supporting and spacing the top plate of the turbine casing relatively to the bottom plate. In other words, it is proposed to use this slightly modified form of the link with any turbine structure where it may be found applicable and effective in the performance of its function.

If a block of obstructive material or débris or other foreign matter lodges between the point 5ª of the gate 5 and the back end 6ᵇ of the gate 6, as shown by Fig. 3, during the closing operation of the gates, it is obvious that the two gates thus affected will be held against proper closing movement, and as a consequence the strain due to governor capacity will be imposed at the point of engagement of the obstructive material or other foreign matter between the two gate extremities, and it will therefore be impossible to move the gates so affected into closed position. The abnormal strain imposed upon the gates due to the obstruction just explained will result in the fracture of the ends 12 of the links connected to the arms or levers 7 and 8 and permit the governor mechanism usually associated with means for operating turbine gates to close the remaining gates. If a block of obstructive material or foreign matter becomes wedged between the guide vane extremity 10ª and the adjacent end 6ᵇ of the gate 6, for example, during the opening movement of the gates, the entire capacity of the governor will be imposed upon the one gate, or the gate 6 and the stem and arm and lever of this latter gate, and as a result the end 13 of the link connecting this gate with the gate ring or other gate-operating means will fracture and thereby permit the remaining gates of the group of gates to be opened by the action of the governor. The improved links will operate to release obstructed gates in their opening or closing movements with the same efficiency and advantage.

It will be noted that the breaking sections or portions of the improved link may be completely finished so that the size thereof may be exactly calculated and made. Tensile tests of the metal from which the links are constructed are made and the area of the breaking section determined after the strength of the metal is calculated from the said tests. An important feature of the link is the clearance provided for the piece or member which breaks out at the end of the link yielding to fracture when the said link end is under abnormal strain or compression. When a block or other matter becomes wedged between two gates, or between parts of the gates and other parts of the turbine structure hereinbefore specified, and the governor mechanism operates under these conditions to actuate the gates, the entire load will come upon the gates affected or obstructed and the stem, arms or levers and links, or upon the links and their connections when links are used which are breakable at one end only, and as a consequence the links connected to the gates obstructed will break at the weakened ends thereof, and when these links have become broken the governor will continue to actuate the means for moving the gate-operating means to open and close all of the gates of the group in accordance with the particular link application except the gates that may be obstructed and in connection with which the links have broken, these latter gates standing in a partially open position. It is also proposed to make each link of sufficient length so that enough clearance is provided at all times for the operation thereof, or so that the end of the link connected to the gate-operating means or gate ring will not come into contact with the broken piece of the link, because if the gate ring end of the link does come into contact with the broken piece, it will force this piece against the adjacent arm or portion of the turbine organization, or against the lever arm pin, and the entire capacity of the governor will again be imposed upon the two arms or levers and gate stems of the two gates. In other words, the broken-out pieces of the links will have a complete clearance and will not obstruct the operation of the means link end provided with an outer breakable member, the breakable members when fractured and separated from the link clearing the openings and releasing the said link ends from connecting means therefor.

11. A link for purpose specified having a connecting opening through each end thereof and a weakened breakable body structure adjacent to each opening to automatically render the link inoperative as a connecting means when subjected to abnormal stress.

In testimony whereof I have hereunto set my hand.

GEORGE A. JESSOP.